(12) United States Patent
Suciu et al.

(10) Patent No.: US 10,414,509 B2
(45) Date of Patent: Sep. 17, 2019

(54) PROPULSOR MOUNTING FOR ADVANCED BODY AIRCRAFT

(71) Applicant: UNITED TECHNOLOGIES CORPORATION, Farmington, CT (US)

(72) Inventors: Gabriel L. Suciu, Glastonbury, CT (US); Jesse M. Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 393 days.

(21) Appl. No.: 15/439,988

(22) Filed: Feb. 23, 2017

(65) Prior Publication Data
US 2018/0237147 A1    Aug. 23, 2018

(51) Int. Cl.
| B64D 27/00 | (2006.01) |
| B64D 27/26 | (2006.01) |
| B64D 27/20 | (2006.01) |
| B64D 35/04 | (2006.01) |

(52) U.S. Cl.
CPC .............. *B64D 27/26* (2013.01); *B64D 27/20* (2013.01); *B64D 35/04* (2013.01); *B64D 2027/268* (2013.01)

(58) Field of Classification Search
CPC .. B64D 27/20; B64D 27/26; B64D 2027/262; B64D 2027/266; B64D 2027/268
See application file for complete search history.

(56) References Cited

U.S. PATENT DOCUMENTS

| 3,659,422 A | 5/1972 | Hope |
| 4,254,619 A | 3/1981 | Giffin |
| 4,462,206 A | 7/1984 | Aguet |
| 4,679,394 A | 7/1987 | Taylor |
| 4,996,836 A | 3/1991 | Reh et al. |
| 5,778,659 A | 7/1998 | Duesler |
| 5,966,525 A | 10/1999 | Manzi |
| 6,260,800 B1 | 7/2001 | Snell |
| 6,409,469 B1 | 6/2002 | Tse |

(Continued)

FOREIGN PATENT DOCUMENTS

| EP | 1847457 | 10/2007 |
| FR | 57850 E | 9/1953 |
| FR | 2928136 | 9/2009 |

OTHER PUBLICATIONS

Extended European Search Report for EP Application No. 18158420.2, dated Jul. 10, 2018.

*Primary Examiner* — Richard G Davis
(74) *Attorney, Agent, or Firm* — Carlson, Gaskey & Olds, P.C.

(57) ABSTRACT

A propulsor and mount arrangement comprises a propulsor rotor and a fan casing surrounding the propulsor rotor. The fan casing receives two side mounts and a thrust link pivotally attached to the fan casing at a location that will be within 10° of a vertically lowermost location when the propulsor is mounted on an aircraft, and the side mounts being at circumferentially opposed positions, and within a lower 270° when the propulsor is mounted on an aircraft. At least a portion of both the side mounts, and a pivot point connect the thrust link to the fan casing in a common plane defined perpendicular to a rotational axis of the propulsor rotor. An aircraft is also disclosed.

20 Claims, 4 Drawing Sheets

(56) References Cited

U.S. PATENT DOCUMENTS

| | | |
|---|---|---|
| 6,439,840 B1 | 8/2002 | Tse |
| 6,845,606 B2 | 1/2005 | Franchet |
| 7,107,756 B2 | 9/2006 | Rolt |
| 8,015,796 B2 | 9/2011 | Babu et al. |
| 2008/0121754 A1* | 5/2008 | Marche .................. B64D 27/20 244/54 |
| 2013/0074517 A1* | 3/2013 | Suciu ..................... B64D 27/26 60/797 |
| 2013/0233997 A1* | 9/2013 | Suciu ..................... B64D 27/26 248/554 |
| 2014/0117152 A1 | 5/2014 | Suciu |
| 2015/0251768 A1* | 9/2015 | Woolley ................. B64D 27/26 244/54 |
| 2017/0043878 A1* | 2/2017 | Pautis .................... B64D 27/12 |

* cited by examiner

PROPULSOR MOUNTING FOR ADVANCED BODY AIRCRAFT

STATEMENT REGARDING FEDERALLY SPONSORED RESEARCH OR DEVELOPMENT

This invention was made with government support under Contract No. NND15AC56C, awarded by NASA. The Government has certain rights in this invention.

BACKGROUND OF THE INVENTION

This application relates to a mounting structure for mounting double propulsors in a tail section of advanced aircraft bodies.

A proposed aircraft has a wide fuselage body that extends wider in the lateral direction than it extends in a vertical direction. Propulsor units for the aircraft are mounted in the tail section side by side on top of a fuselage. This arrangement is intended to ingest boundary layer air.

The location of the propulsors raises challenges with regard to mounting.

SUMMARY OF THE INVENTION

In a featured embodiment, a propulsor and mount arrangement comprises a propulsor rotor and a fan casing surrounding the propulsor rotor. The fan casing receives two side mounts and a thrust link pivotally attached to the fan casing at a location that will be within 10° of a vertically lowermost location when the propulsor is mounted on an aircraft, and the side mounts being at circumferentially opposed positions, and within a lower 270° when the propulsor is mounted on an aircraft. At least a portion of both the side mounts, and a pivot point connect the thrust link to the fan casing in a common plane defined perpendicular to a rotational axis of the propulsor rotor.

In another embodiment according to the previous embodiment, each of the side mounts includes a spherical member mounted to the fan casing and being received within a spherical recess in a frame structure.

In another embodiment according to any of the previous embodiments, one of the side mounts has a clearance between the frame structure and an outermost portion, and the other the side mounts does not have clearance such that the other of the side mounts reacts against side loads.

In another embodiment according to any of the previous embodiments, a drive structure to the propulsor rotor includes a drive shaft driven by a gas turbine engine and driving shafts which, in turn, drive rotor drive shafts which drive the propulsor rotors.

In another embodiment according to any of the previous embodiments, the fan casing has a band on an outer periphery that provides a mount location for each of the side mounts and a thrust link pivot point.

In another embodiment according to any of the previous embodiments, a plate is secured to the spherical ball, such that the plate allows rotation about an axis generally perpendicular to the rotational axis of the propulsor rotor.

In another embodiment according to any of the previous embodiments, the fan casing has a band on an outer periphery that provides a mount location for each of the side mounts and a thrust link pivot point.

In another featured embodiment, an aircraft comprises a fuselage and a pair of propulsor units mounted in a tail section of the fuselage. Each of the propulsor units include a propulsor rotor and a fan casing surrounding the propulsor rotor, the fan casing receiving two side mounts and a thrust link pivotally attached to the fan casing at a location within 10° of a vertically lowermost location, and the side mounts being at circumferentially opposed positions, and within a lower 270°. At least a portion of both the side mounts, and a pivot point connect the thrust link to the fan casing being in a common plane defined perpendicular to a rotational axis of the propulsor rotor.

In another embodiment according to the previous embodiment, each of the side mounts includes a spherical member mounted to the fan casing and being received within a spherical recess in a frame structure.

In another embodiment according to any of the previous embodiments, one of the side mounts has a clearance between the frame structure and an outermost portion, and the other the side mounts does not have clearance such that the other of the side mounts reacts against side loads.

In another embodiment according to any of the previous embodiments, a drive structure to the propulsor rotor includes a drive shaft driven by a gas turbine engine and driving shafts which, in turn, drive rotor drive shafts which drive the propulsor rotors.

In another embodiment according to any of the previous embodiments, the fan casing has a band on an outer periphery that provides a mount location for each of the side mounts and a thrust link pivot point.

In another embodiment according to any of the previous embodiments, a plate is secured to the spherical ball, such that the plate allows rotation about an axis generally perpendicular to the rotational axis of the propulsor rotor.

In another embodiment according to any of the previous embodiments, a drive structure to the propulsor rotor includes a drive shaft driven by a gas turbine engine and driving shafts which, in turn, drive rotor drive shafts which drive the propulsor rotors.

In another embodiment according to any of the previous embodiments, the fan casing has a band on an outer periphery that provides a mount location for each of the side mounts and a thrust link pivot point.

In another embodiment according to any of the previous embodiments, a plate is secured to the spherical ball, such that the plate allows rotation about an axis generally perpendicular to the rotational axis of the propulsor rotor.

In another embodiment according to any of the previous embodiments, the fan casing has a band on an outer periphery that provides a mount location for each of the side mounts and a thrust link pivot point.

These and other features may be best understood from the following drawings and specification.

DETAILED DESCRIPTION

A modern aircraft 20 has a wide fuselage 22. The lateral dimension of the fuselage 22, or width, is much greater than a vertical dimension.

Twin propulsors 24 are mounted between the tail section 26. The propulsors 24 must be mounted from their vertically lower locations and, thus, a mount structure must be developed.

Figure 1A:
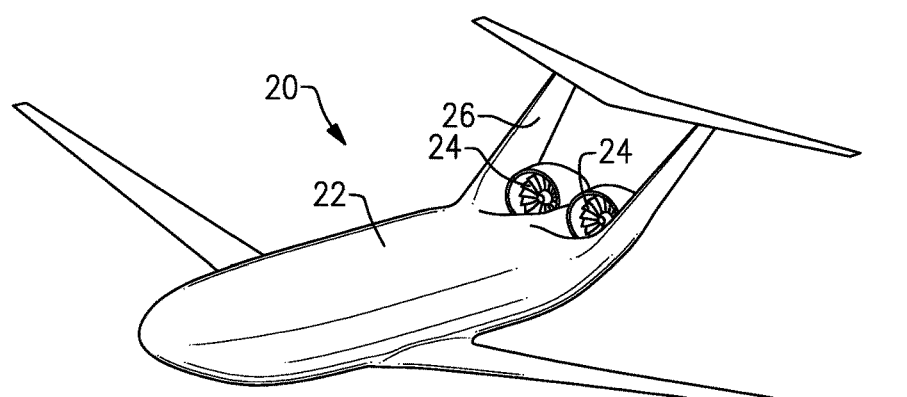
FIG. 1A shows a modern aircraft design.
Figure 1B:
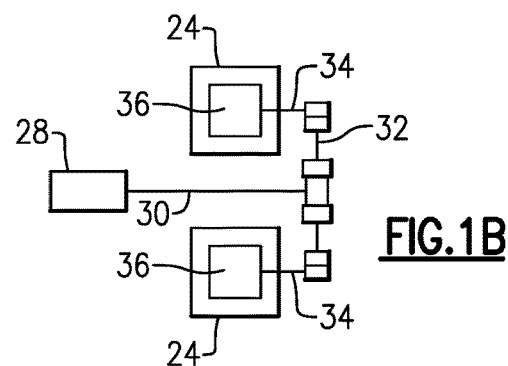
FIG. 1B schematically shows a drive arrangement for propulsors.

FIG. 1B schematically shows a drive arrangement for the propulsors 24. As shown, a main gas generator 28, which may be a standard gas turbine engine, drives a shaft 30. The shaft 30 has gears engaging gears that drive shaft 32 extending to drive fan rotor drive shafts 34 through gears. The fan rotor drive shafts drive propulsor rotors 36. Shaft 30 is parallel to a rotation axis of rotors 36 and shaft 32 is perpendicular.

Figure 2:
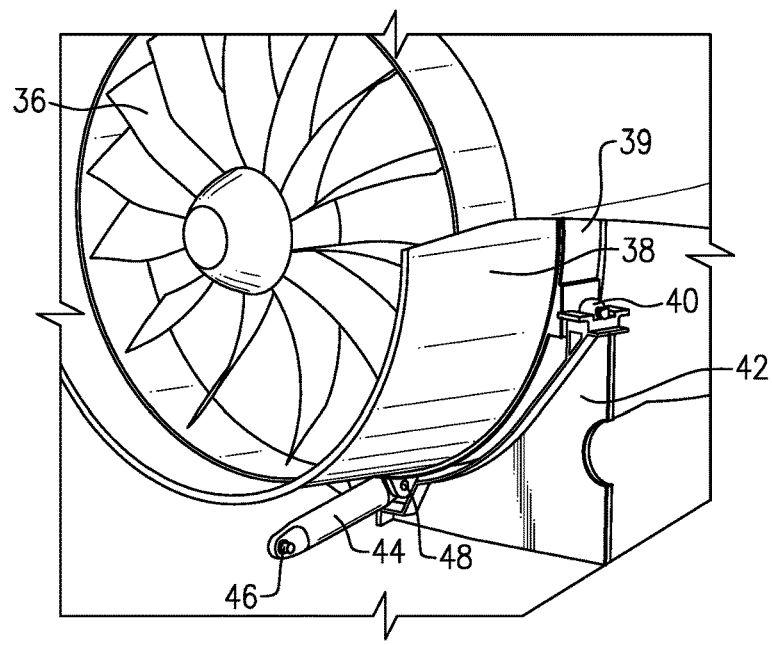
FIG. 2 shows a detail of a propulsor.

FIG. 2 shows propulsor rotor 36 mounted within a housing 38. A side mount 40 connects the housing 38 to frame structure 42. A thrust link 44 is connected at a pivot point 46 to the frame (not shown) and at a pivot point 48 to the housing 38. The mount 40 and link 44 are connected to a band 39, secured to housing 38.

Figure 3A:
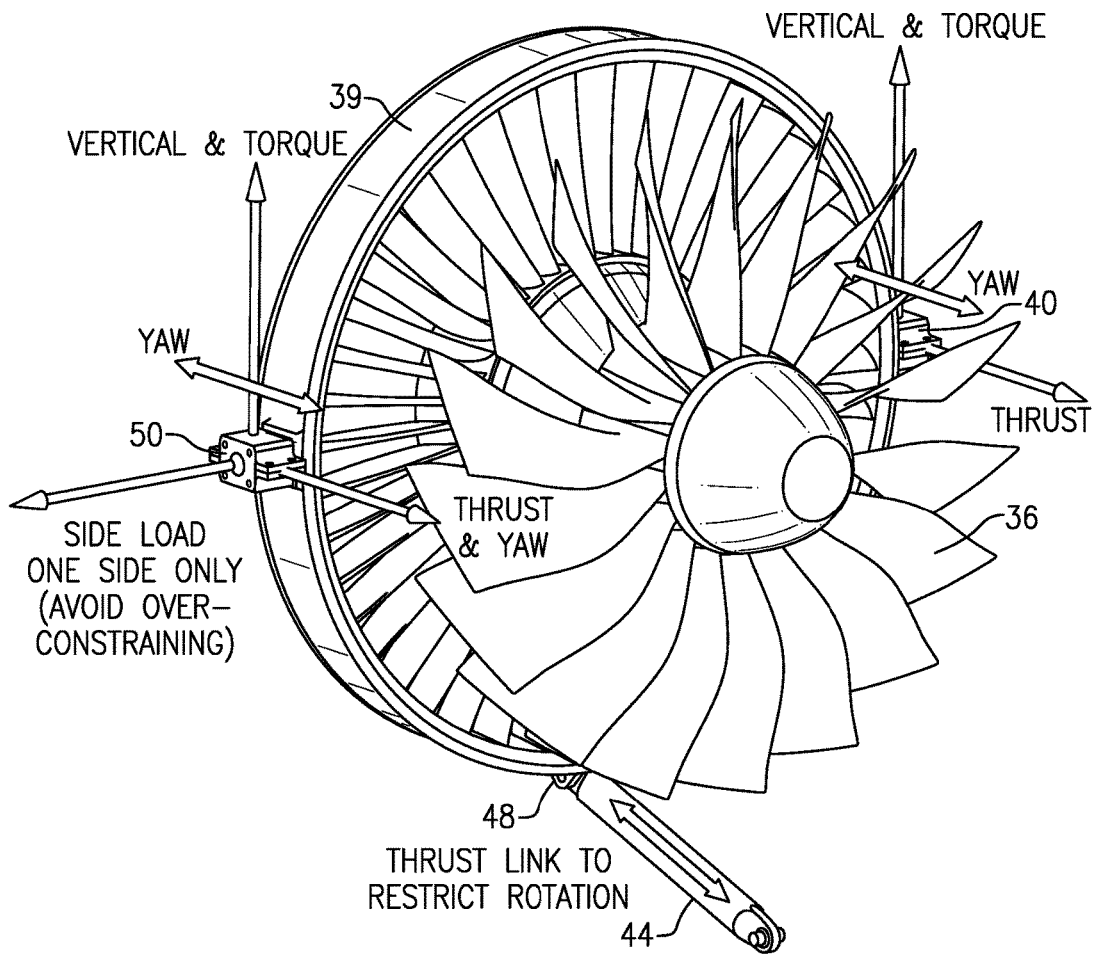
FIG. 3A shows mount details.

FIG. 3A shows details of the mount. As shown, the band 39 receives the side mount 40 and the thrust link 44 at pivot point 48. A second side mount 50 is similar to side mount 40 but is different in one regard, as will be explained below.

One of the two side mounts 40 and 50 transmits side load from the housing band 39 (and hence housing 38) to the frame. Both side mounts 40/50 allow rotation of the fan casing 38 about an axis perpendicular to an axis of rotation of the rotor 36. In this disclosure, that would be side mount 50. Sides mounts 40 and 50 also allow yaw and react against vertical forces and torque. Further, they react against thrust and yaw in a direction generally parallel to the axis of rotation of rotor 36 fan. The thrust link 44 resists rotation of the band 39 and hence housing 38.

Figure 3B:
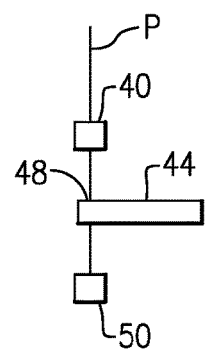
FIG. 3B shows a structural feature.

FIG. 3B shows a feature. A single plane P defined perpendicular to the rotational axis of the fan rotor 36 passes through at least a portion of the mounts 40 and 50 and through the pivot point 48. That is, it could be said that all three mount points for the propulsor 24 have at least a portion in a single plane.

Figure 4A:
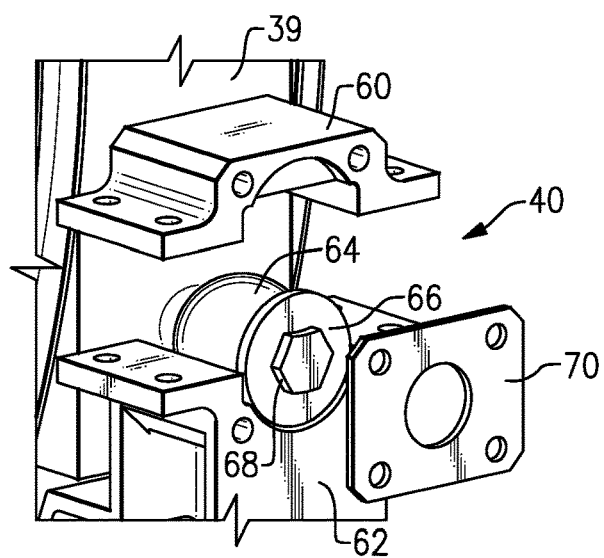
FIG. 4A shows a side mount.

FIG. 4A shows details of the side mount 40. As shown, static frames 60 and 62 support and receive a spherical ball 64. The spherical ball 64 is bolted at 68 to a plate or washer 66. A static thrust plate 70 sits outwardly.

Figure 4B:
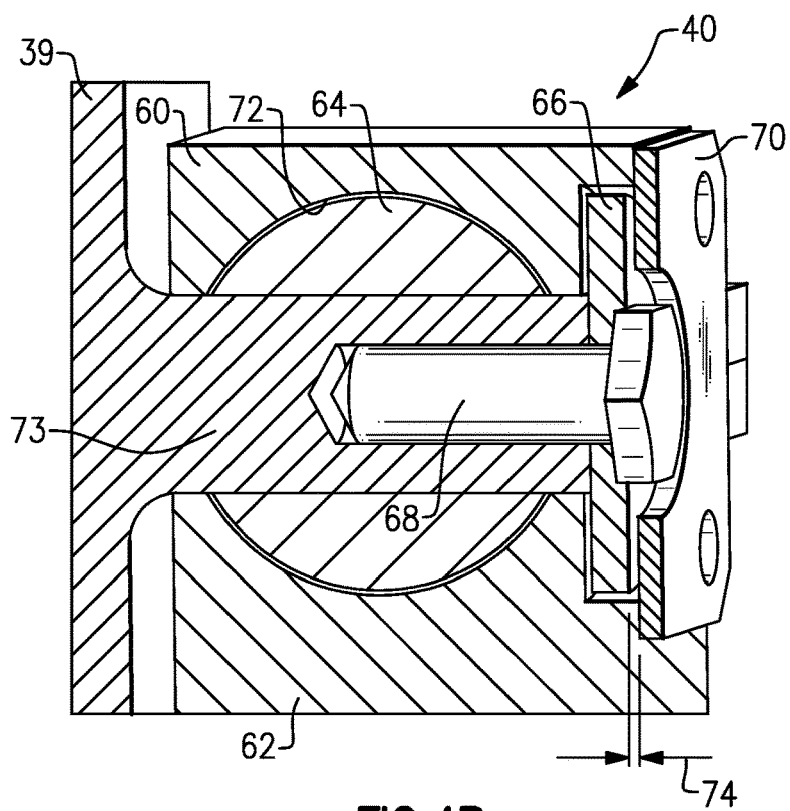
FIG. 4B shows the assembled side mount.

FIG. 4B shows the arrangement including the band 39 having a shaft structure 73, which receives the bolt 68 to secure the plate 66. As shown, the spherical ball 64 may move within a spherical cavity 72 in the frame 60/62. This allows reaction against vertical forces, torque, yaw, and thrust. As shown, there is a clearance 74 between an inner face of the plate 70 and an outer face of the washer 66. Thus, on the side 40, there will not be a reaction against side load.

Figure 4C:
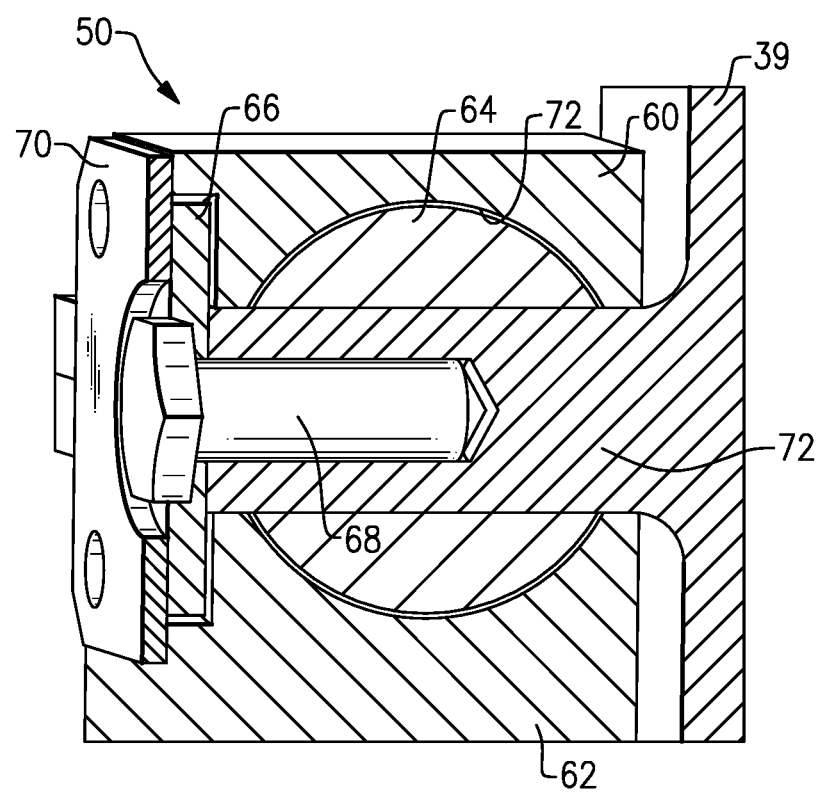
FIG. 4C shows an opposed side mount location.

FIG. 4C shows the side mount 50, which is generally similar to the side mount 40, other than the clearance 74 is eliminated. This allows the reaction against side load.

This disclosure could be summarized as a propulsor 24 and mount arrangement having a propulsor rotor 36 and a fan casing 38 surrounding the propulsor rotor. The fan casing receives two side mounts 40/50 and a thrust link 44 pivotally attached to the fan casing.

As is clear from FIG. 3A, the thrust link 44 is mounted at a location that will be within 10° of a vertically lowermost location of the propulsor when the propulsor is mounted on an aircraft. As is also clear, the side mounts 40/50 are at circumferentially opposed positions and within a lower 270° when the propulsor is mounted on an aircraft. Also, the side mounts are outside of a lower 90°. All of the above angles are defined symmetrically about a pivot point 48 between the thrust link and casing.

At least a portion of both the side mounts 40/50 and a pivot point 48 that connects the thrust link 44 to the fan housing being in a common plane defined perpendicular to the rotational axis of the propulsor.

This disclosure thus provides a simple, yet effective, method for mounting a propulsor in a unique wide-body aircraft fuselage.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A propulsor and mount arrangement comprising:
 a propulsor rotor and a fan casing surrounding said propulsor rotor, said fan casing receiving two side mounts and a thrust link pivotally attached to said fan casing at a location that will be within 10° of a vertically lowermost location when the propulsor is mounted on an aircraft, and said side mounts being at circumferentially opposed positions, and within a lower 270° when said propulsor is mounted on an aircraft; and
 at least a portion of both said side mounts, and a pivot point connecting said thrust link to said fan casing being in a common plane defined perpendicular to a rotational axis of said propulsor rotor.

2. The propulsor and mount arrangement as set forth in claim 1, wherein each of said side mounts includes a spherical member mounted to said fan casing and being received within a spherical recess in a frame structure.

3. The propulsor and mount arrangement as set forth in claim 2, wherein one of said side mounts has a clearance between said frame structure and an outermost portion, and the other said side mounts does not have clearance such that said other of said side mounts reacts against side loads.

4. The propulsor and mount arrangement as set forth in claim 3, wherein a drive structure to said propulsor rotor includes a drive shaft driven by a gas turbine engine and driving shafts which, in turn, drive rotor drive shafts which drive said propulsor rotors.

5. The propulsor and mount arrangement as set forth in claim 4, wherein said fan casing has a band on an outer periphery that provides a mount location for each of said side mounts and a thrust link pivot point.

6. The propulsor and mount arrangement as set forth in claim 5, wherein a plate is secured to said spherical ball, such that said plate allows rotation about an axis generally perpendicular to said rotational axis of said propulsor rotor.

7. The propulsor and mount arrangement as set forth in claim 1, wherein a drive structure to said propulsor rotor includes a drive shaft driven by a gas turbine engine and driving shafts which, in turn, drive rotor drive shafts which drive said propulsor rotors.

8. The propulsor and mount arrangement as set forth in claim 7, wherein said fan casing has a band on an outer periphery that provides a mount location for each of said side mounts and a thrust link pivot point.

9. The propulsor and mount arrangement as set forth in claim 8, wherein a plate is secured to said spherical ball, such that said plate allows rotation about an axis generally perpendicular to said rotational axis of said propulsor rotor.

10. The propulsor and mount arrangement as set forth in claim 1, wherein said fan casing has a band on an outer periphery that provides a mount location for each of said side mounts and a thrust link pivot point.

11. An aircraft comprising:
a fuselage and a pair of propulsor units mounted in a tail section of said fuselage, wherein each of said propulsor units include a propulsor rotor and a fan casing surrounding said propulsor rotor, said fan casing receiving two side mounts and a thrust link pivotally attached to said fan casing at a location within 10° of a vertically lowermost location, and said side mounts being at circumferentially opposed positions, and within a lower 270°; and
at least a portion of both said side mounts, and a pivot point connecting said thrust link to said fan casing being in a common plane defined perpendicular to a rotational axis of said propulsor rotor.

12. The aircraft as set forth in claim 11, wherein each of said side mounts includes a spherical member mounted to said fan casing and being received within a spherical recess in a frame structure.

13. The aircraft as set forth in claim 12, wherein one of said side mounts has a clearance between said frame structure and an outermost portion, and the other said side mounts does not have clearance such that said other of said side mounts reacts against side loads.

14. The aircraft as set forth in claim 13, wherein a drive structure to said propulsor rotor includes a drive shaft driven by a gas turbine engine and driving shafts which, in turn, drive rotor drive shafts which drive said propulsor rotors.

15. The aircraft as set forth in claim 14, wherein said fan casing has a band on an outer periphery that provides a mount location for each of said side mounts and a thrust link pivot point.

16. The aircraft as set forth in claim 15, wherein a plate is secured to said spherical ball, such that said plate allows rotation about an axis generally perpendicular to said rotational axis of said propulsor rotor.

17. The aircraft as set forth in claim 11, wherein a drive structure to said propulsor rotor includes a drive shaft driven by a gas turbine engine and driving shafts which, in turn, drive rotor drive shafts which drive said propulsor rotors.

18. The aircraft as set forth in claim 17, wherein said fan casing has a band on an outer periphery that provides a mount location for each of said side mounts and a thrust link pivot point.

19. The aircraft as set forth in claim 18, wherein a plate is secured to said spherical ball, such that said plate allows rotation about an axis generally perpendicular to said rotational axis of said propulsor rotor.

20. The aircraft as set forth in claim 11, wherein said fan casing has a band on an outer periphery that provides a mount location for each of said side mounts and a thrust link pivot point.

* * * * *